J. F. RUDE.
DRIVING MEANS FOR MANURE SPREADER BEATERS.
APPLICATION FILED AUG. 1, 1918.

1,325,958. Patented Dec. 23, 1919.

WITNESS.
Walter H. Trommel

INVENTOR
John F. Rude
BY
Bradford & Dodie
ATTORNEYS

UNITED STATES PATENT OFFICE.

JOHN F. RUDE, OF LIBERTY, INDIANA.

DRIVING MEANS FOR MANURE-SPREADER BEATERS.

1,325,958.    Specification of Letters Patent.    Patented Dec. 23, 1919.

Application filed August 1, 1918. Serial No. 247,811.

*To all whom it may concern:*

Be it known that I, JOHN F. RUDE, a citizen of the United States, residing at Liberty, Union county, and State of Indiana, have invented and discovered certain new and useful Improvements in Driving Means for Manure-Spreader Beaters, of which the following is a specification.

My invention relates to driving means for manure spreader beaters and the objects of the invention are to provide a construction of this kind particularly adapted for beaters the axes of which are placed at an angle to the cross axis of the spreader which shall obtain in such arrangement a strong and rigid support for the shaft at the point of greatest strain, to enable a long bearing for the driving gear of the beaters to be employed, and to facilitate the assemblage of the parts.

With these objects in view, my invention is embodied in preferable form in the construction hereinafter described and illustrated in the accompanying drawings.

Figure 1:
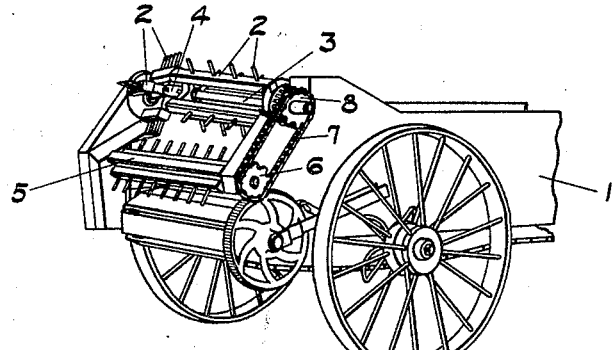
Figure 2:
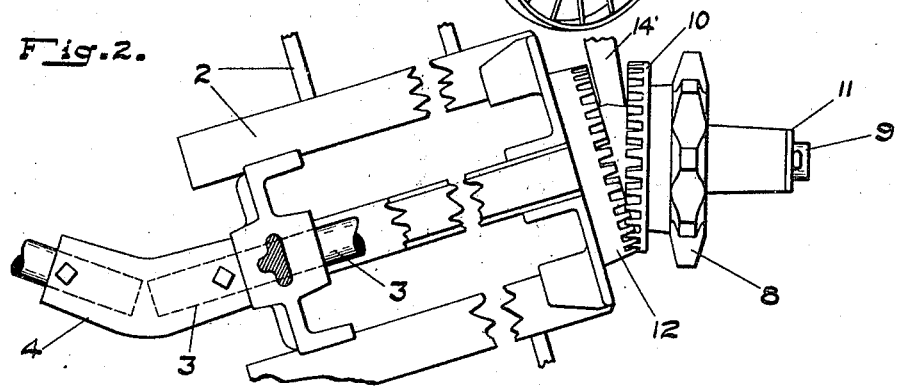
Figure 3:
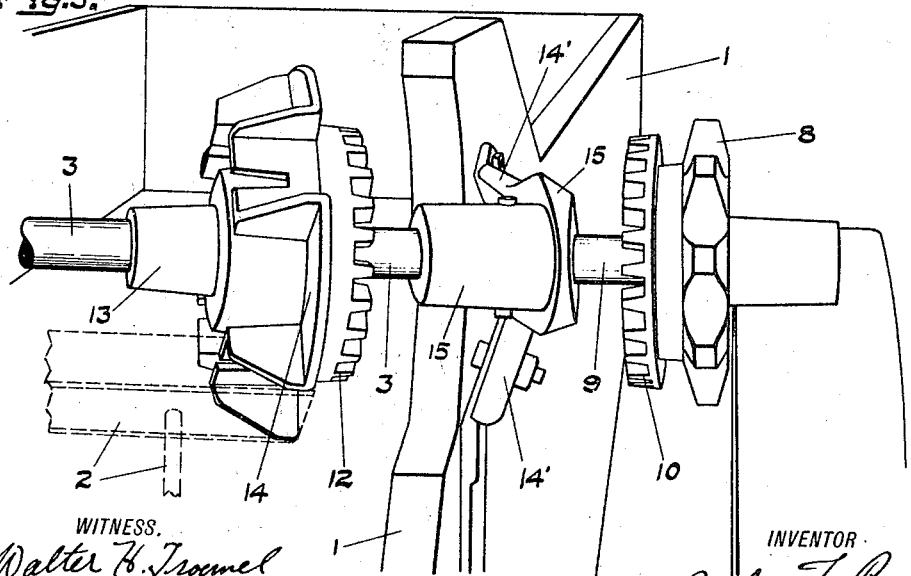

Referring to these drawings, Figure 1 is a perspective view of the rear end of a manure spreader provided with a pair of angularly disposed beater members; Fig. 2, a top plan view of said rear end of a manure spreader; and Fig. 3, an enlarged detail rear elevation of the driving mechanism showing the parts of the latter slightly spaced apart.

Referring to the drawings, 1 indicates the body of the manure spreader and 2 indicates the two rotating toothed members of an upper angularly disposed beater. Each of these beater members is mounted on a separate fixed shaft 3 extending angularly toward the rear of the spreader from each side wall of the body and the shafts meet at the central line of the speader where they are joined by a coupling 4. Each beater member 2 is adapted to be separately driven, and to this end on each end of the shaft of a lower straight beater 5 is fixed a sprocket wheel 6 adapted to drive a chain 7 which in turn drives a sprocket 8. This sprocket 8 is mounted loosely upon a straight extension 9 of the fixed shaft 3, such extension projecting at right angles to the length of the spreader. On the hub of the sprocket 8 is fixed a crown gear 10. The sprocket is held on the shaft by means of a fixed collar 11. The driving gear 10 is adapted to mesh with a driven crown gear 12, mounted on the angularly extending part of the shaft, and carried by a hub 13 which has a shouldered and recessed ring 14 adapted to interlock with the hub of the beater member so as to rotate the latter.

Fixed on the exterior face of the side of the body is a bracket 14 extending angularly forward and carrying at its end a supporting collar 15 fixed to the bent part of the shaft of the beater member and located between the driving and driven gears 10 and 12. The collar 15 is partly cut away so as to fit between the gears 10 and 12 and permit the meshing of the teeth of the latter along those segments of the same which are to the rear of the fixed shaft.

From the foregoing it will be understood that the construction and arrangement of parts of gearing for driving said beaters 2, are duplicated on the respective sides of the machine, both sides being as clearly illustrated in Figs. 1 and 2.

By the above arrangement the parts may be easily assembled by slipping the collar and the inner driven gear 12 on the angular portion of the shaft from the inner end of the latter and securing the bracket in place and then placing the outside driving gear in its holding collar on the outer straight portion of the shaft. This construction enables the shaft to be supported at the point of greatest strain, namely, between the two gears, facilitates assemblage of the parts and enables a long and strong straight extension of the shaft to be provided for the support of the driving gear and its sprocket, and also enables such driving gear or sprocket member to be readily accessible and easily removed for repair or replacement.

Having thus described my invention, what I claim is:—

1. In a device of the character described, the combination of a shaft having angularly disposed sections and each section formed with an angle near its outer end, a driving and a driven gear loosely mounted on each section one on one side of the angle therein and the other on the other side with their faces adapted to engage, means for driving each driving gear, and means for supporting the shaft, substantially as set forth.

2. In a device of the character described, the combination of a stationary shaft formed with an angle therein, a driving and a driven gear loosely mounted thereon, and located one on each side of the angle with their faces adapted to engage, means for driving the driven gear, and means for supporting the shaft.

In witness whereof, I have hereunto set my hand and seal at Indianapolis this 23rd day of July, A. D. nineteen hundred and eighteen.

JOHN F. RUDE. [L. S.]

Witnesses:
H. P. DOOLITTLE,
M. L. SHULER.